United States Patent
Sellers et al.

[11] 3,768,990
[45] Oct. 30, 1973

[54] METHOD FOR MAKING HEAT RESISTANT TRANSPARENT OPTICAL ELEMENTS

[75] Inventors: David J. Sellers, Watertown, Mass.; Donald W. Roy, Golden, Colo.

[73] Assignee: Coors Porcelain Company, Golden, Colo.

[22] Filed: Aug. 25, 1972

[21] Appl. No.: 283,873

Related U.S. Application Data

[63] Continuation-in-part of Ser. No. 69,506, Sept. 3, 1970, abandoned.

[52] U.S. Cl............................ 65/18, 65/32, 65/33, 65/134, 106/62, 106/73.1, 106/73.4, 261/1
[51] Int. Cl. .......... C03b 23/20, C03b , C03b 35/04
[58] Field of Search ................... 65/18, 32, 33, 134; 106/62, 73.1, 73.4; 164/1

[56] References Cited
UNITED STATES PATENTS

| | | | |
|---|---|---|---|
| 3,544,266 | 12/1970 | Palmour, III et al | 106/62 X |
| 3,531,308 | 9/1970 | Bagley | 106/62 |
| 3,530,209 | 9/1970 | Ho | 106/62 X |
| 3,431,326 | 3/1969 | Letter | 106/73.1 X |
| 3,294,878 | 12/1966 | Carnall, Jr. et al | 106/73.1 X |
| 3,589,880 | 6/1971 | Clark | 65/32 |

Primary Examiner—Frank W. Miga
Attorney—Paul J. Reising

[57] ABSTRACT

In accordance with the invention a high temperature resistant optical element having transparency in the visible and infrared wave length regions of the electromagnetic spectrum is manufactured by heating to a temperature of from about 800° C to 1,250° C, in a vacuum, a composition containing substantially equal molar amounts of magnesium oxide and aluminum oxide, the composition having a sub-micron particle size and having uniformly mixed therewith from about 0.2 to 4 percent by weight powdered lithium fluoride, and then applying a pressure of at least about 8000 psi to the composition for from about 1/2 to 3 hours after the temperature of the composition has been raised to about from 1300° C to 1600° C.

4 Claims, No Drawings

METHOD FOR MAKING HEAT RESISTANT TRANSPARENT OPTICAL ELEMENTS

This application is a continuation-in-part of our pending U.S. Pat. application Ser. No. 69,506, filed Sept. 3, 1970, now abandoned.

This invention relates to optical elements and, more particularly, to an improved method for manufacturing high temperature resistant optical elements having transparency in the visible and infrared wave length regions of the electromagnetic spectrum. Such optical elements find utility as strong high temperature resistant windows for the transmission of visible and infrared light, as encapsulations for ionized alkali vapor lamps, and like applications where there is a requirement for a material having transparency in combination with high heat resistance, mechanical strength and good resistance to thermal shock.

The principal object of the present invention is the provision of an improved such optical element formed of magnesiaalumina spinel ($MgO \cdot Al_2O_3$). Another and related object is the provision of an improved method for manufacturing a magnesia-alumina spinel optical element having good transparency in the visible and infrared wave length regions of the electromagnetic spectrum along with the other desired properties as aforesaid. More specifically, it is an object of the present invention to provide an improved hot-pressing method for the manufacture of such optical elements.

Briefly, these and other objects are accomplished, in accordance with the invention, by heating in a vacuum to a temperature of about 800° C to 1,250° C a composition containing substantially equal molar amounts of magnesium oxide and aluminum oxide of sub micron particle size in uniform admixture with about 0.2 percent to 4 percent, preferably 1.5 percent, by weight finely divided lithium fluoride, and then pressing the composition for about ½ to 3 hours at a pressure of at least about 8,000 psi, and preferably from about 10,000 to 15,000 psi, after the temperature of the composition has been raised to where its temperature is from about 1,300° C to 1,600° C. The composition which is mixed with the lithium fluoride prior to the heating thereof in a vacuum may be magnesia-alumina spinel, or a mixture of magnesia and alumina; and we have found it advantageous that the magnesia-alumina spinel which is mixed with the lithium fluoride be formed by the freeze-drying technique as hereinafter specified. The resulting magnesia-alumina spinel optical elements have the required good transparency along with the strength and other characteristics needed.

PREPARATION OF THE COMPOSITION FOR HEAT TREATMENT IN ADMIXTURE WITH LITHIUM FLUORIDE

The composition which is mixed with the lithium fluoride for the vacuum heat treatment can consist of a mixture of equal molar amounts of finely divided, preferably sub micron sized, aluminum oxide and magnesium oxide, though a slight excess of either magnesium oxide or aluminum oxide can be used. Alternatively, the composition mixed with the lithium fluoride can consist of the desired spinel itself, formed prior to the admixture with the lithium fluoride. One manner of accomplishing this is to mix equal molar amounts of sub micron sized aluminum oxide and magnesium oxide and then heat the mixture to about 1,200 to 1,250° C for from 30 to 60 minutes in the ambient atmosphere at which time the reaction is complete and the spinel is formed. A slight excess, of either the magnesium oxide or the aluminum oxide can be used if desired. Also, instead of using magnesium oxide it is satisfactory to use a magnesium compound, such as magnesium carbonate, which upon heating to the reaction temperature for spinel formation converts to magnesium oxide without leaving a residue. However, where such a compound is used the amount should be such as to result in the desired molar amount of magnesium oxide, i.e., a molar amount substantially the same as that of the aluminum oxide. After the spinel is formed it should be ball milled to fine, preferably sub micron, particle size before admixture thereof with the lithium fluoride.

We have found, however, that best results are attained if the composition which is mixed with the lithium fluoride for the vacuum heat treatment is magnesia-alumina spinel prepared by freeze drying and subsequent heating as will now be described.

First, there is prepared an aqueous solution of a water soluble aluminum salt and a water soluble magnesium salt each of which, upon heating in the ambient atmosphere, converts to the metal oxide, i.e. aluminum oxide and magnesium oxide respectively. The preferred aqueous solution is one of ammonium aluminum sulphate - $AlNH_4(SO_4)_2 \cdot 12H_2O$ - and magnesium sulphate —$MgSO_4 \cdot 7H_2O$. The proportions of the two salts should be such that on the basis of the oxides to which they are subsequently converted, there are substantially equal molar amounts of the two oxides. The precise concentration of the aqueous solution is not critical though it is desirable that for cost savings in processing a relatively concentrated solution be used. An aqueous solution made up by mixing 728 grams ammonium aluminum sulphate (of the formula set forth above, including the water of hydration) and 200 grams magnesium sulphate (the heptahydrate, as set forth above) per liter of solution is typical. The aqueous solution, so prepared, is then introduced, with agitation, into hexane or a similar water immiscible organic vehicle having a low freezing point, which is at a temperature well below the freezing temperature of the solution. Hexane at a temperature of about −60° C is excellent. Immediately upon being introduced into the cold organic vehicle the aqueous solution freezes to a solid state in the form of small crystals, and this solid material is then removed from the organic vehicle and placed in a vacuum chamber whereby the water is removed. The resulting product is an extremely fine powder consisting of an intimate mixture of the two salts. This powder is then calcined by heating, which can be in a normal (ambient) atmosphere, to about 950° C to 1,250° C for a period sufficient to decompose the salts to oxides and to cause conversion to magnesia-alumina spinel. The exact time of heating required will depend upon the temperature used. From about 12 to 16 hours at 1,250° C is a typical time-temperature schedule. The resulting magnesia-alumina spinel is of extremely small particle size, well under one micron.

HEAT TREATMENT OF THE COMPOSITION IN A VACUUM IN ADMIXTURE WITH LITHIUM FLUORIDE

The composition, preferably magnesia-alumina spinel prepared by the aforesaid freeze drying method, is next uniformly mixed with lithium fluoride powder in an amount sufficient that the resulting mixture contains from about 0.2 percent to 4 percent, preferably 1.5 percent by weight of the lithium fluoride. The required amount of this mixture to provide an optical element of the dimensions desired is then placed in the opening of a hot-pressing die. The hot-pressing die can be of conventional construction. That is, the hot-pressing die can comprise a sleeve of graphite or other suitable die material, the lower end of which rests on a block of graphite, and with a graphite punch for insertion in the upper end of the sleeve for the application of high pressure to the material placed within the sleeve, the entire assembly being in a chamber having means for the evacuation thereof and means for generating high temperatures. Such hot-pressing apparatus, suitable for the practice of the present invention, is shown, for example, in U.S. Pat. No. 3,131,025. After the mixture, as aforesaid, is placed in the die opening, the chamber is evacuated preferably to a pressure of less than 1,000 microns Hg, and the die is heated until the mixture attains a temperature of from about 800° C to 1,250° C. During this heating, prior to the application of pressure, some of the lithium fluoride may vaporize. Therefore, to insure against total loss of the lithium fluoride prior to the subsequent pressing operation it is desirable that the heating, once the temperature is within the aforesaid range, not be continued for more than about 30 minutes prior to application of the pressure in accordance with the next step. Lithium fluoride appears to function as a densification agent. High densification is important to the attainment of optimum transparency and the other physical characterictics desired.

HOT PRESSING OPERATION

After the aforesaid pre-pressing heat treatment in a vacuum, the graphite punch is actuated to apply a pressure of at least about 8000 psi, and preferably from about 10,000 to 15,000 psi, to the magnesia-alumina spinel after which the temperature thereof is raised to from about 1,300° C to 1,600° C. The pressure is continuously applied, at such temperature, for about ½ to 3 hours.

After the pressing operation the pressed optical element is allowed to cool and is then removed from the apparatus thereby completing manufacture except, of course, for any subsequent machining or other secondary operations as may be required to be performed on the optical element.

Optical elements made in accordance with the invention have shown in line transmission in the visible wave length region (i.e. a wave length of from about 0.4 microns to 0.7 microns wave length) in excess of 75 percent for a millimeter thickness of the element, and in line transmissions in the infrared wave length region (i.e., from 1 to 7 microns wave length) in excess of 80 percent for a millimeter thickness of the element. The elements additionally have excellent mechanical strength, thermal shock resistance and heat resistance.

It will be understood that while the invention has been described particularly with reference to a preferred embodiment thereof, various changes may be made all within the full and intended scope of the claims which follow.

The embodiments of the invention in which an exclusive property or privilege is claimed are defined as follows:

1. A method for manufacturing a high temperature resistant optical element having transparency in the visible and infrared wave length regions of the electromagnetic spectrum comprising the steps of heating to a temperature of from about 800° C to 1,250° C in a vacuum a composition containing substantially equal molar amounts of magnesium oxide and aluminum oxide, said composition having a fine particle size and having uniformly mixed therewith from about 0.2 percent to 4 percent by weight powdered lithium fluoride, and then applying a pressure of at least about 8000 psi to said composition for from about ½ to 3 hours after the temperature of the composition has been raised to about from 1,300° C to 1,600° C.

2. A method for manufacturing an optical element as set forth in claim 1 and wherein said composition with which the lithium fluoride is mixed consists essentially of magnesia-alumina spinel.

3. A method for manufacturing an optical element as set forth in claim 2 and wherein said magnesia-alumina spinel is made by freezing an aqueous solution of aluminum salt and magnesium salt, removing the water from said frozen aqueous solution to thereby provide a dry powder consisting of a mixture of said salts, and then heating said dry powder to convert said salts to metal oxides and to cause said metal oxides to react to form the magnesia-alumina spinel.

4. A method for manufacturing an optical element as set forth in claim 1 wherein the amount of lithium fluoride included in said composition is about 1.5 percent by weight, wherein the pressure applied is from about 8,000 to 15,000 psi and wherein the magnesia-alumina spinel is of sub micron particle size.

* * * * *